United States Patent
Hsu et al.

(10) Patent No.: US 11,431,954 B2
(45) Date of Patent: Aug. 30, 2022

(54) DISPLAY METHOD

(71) Applicant: AU Optronics Corporation, Hsin-Chu (TW)

(72) Inventors: Wei-Ting Hsu, Hsin-Chu (TW); Yen-Wen Fang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 59 days.

(21) Appl. No.: 17/099,848

(22) Filed: Nov. 17, 2020

(65) Prior Publication Data

US 2021/0377506 A1 Dec. 2, 2021

(30) Foreign Application Priority Data

May 26, 2020 (TW) .................. 109117533

(51) Int. Cl.
H04N 13/139 (2018.01)
H04N 19/537 (2014.01)
H04N 19/59 (2014.01)
G06T 3/40 (2006.01)
G06F 3/14 (2006.01)

(52) U.S. Cl.
CPC .............. H04N 13/139 (2018.05); G06F 3/14 (2013.01); G06T 3/4007 (2013.01); H04N 19/537 (2014.11); H04N 19/59 (2014.11)

(58) Field of Classification Search
CPC ......... G09G 2340/0435; H04N 7/0127; H04N 7/013; H04N 7/0132; H04N 7/0135; H04N 7/0137; H04N 7/014; G06T 13/00
See application file for complete search history.

(56) References Cited

U.S. PATENT DOCUMENTS

| 2010/0231593 | A1 | 9/2010 | Zhou et al. | |
| 2014/0198138 | A1* | 7/2014 | Nambi | G09G 3/36 345/87 |
| 2020/0135236 | A1 | 4/2020 | Chuang et al. | |
| 2021/0067735 | A1* | 3/2021 | Reda | G06N 3/0454 |

FOREIGN PATENT DOCUMENTS

| CN | 104680491 A | 6/2015 |
| TW | 202016691 A | 5/2020 |

* cited by examiner

Primary Examiner — Ryan McCulley
(74) Attorney, Agent, or Firm — WPAT, PC

(57) ABSTRACT

A display method includes the following operations. Multiple first image data are received by a processor through a graphics card. Multiple first image data are analyzed based on an artificial intelligence model by the processor. Multiple second image data are transmitted to the display by the processor. Multiple second image data include multiple first image data, at least one compensation image data between adjacent two of multiple first image data, or combinations thereof.

10 Claims, 4 Drawing Sheets

DISPLAY METHOD

CROSS-REFERENCE TO RELATED APPLICATION

This application claims priority to Taiwan Application Serial Number 109117533, filed May 26, 2020, which is herein incorporated by reference in its entirety.

BACKGROUND

Field of Disclosure

The present disclosure relates to a display method. More particularly, the present disclosure relates to a display method of picture compensation.

Description of Related Art

In the prior art, when the rendering time of the image data to be displayed is too long, it causes the output screen tearing and lagging. Although this phenomenon can be overcome by adjusting the screen refresh rate of the display according to the output frame rate of the graphics card, adjusting the screen frame rate through blanking also affect the brightness of the screen.

SUMMARY

In order to solve the above problem, the present disclosure provides a display method including the following steps. A plurality of first image data are analyzed based on an artificial intelligence model by a processor. A plurality of second image data are transmitted to the display by the processor. A plurality of second image data comprises the plurality of first image data, at least one compensation image data between adjacent two of the plurality of first image data, or combinations thereof.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
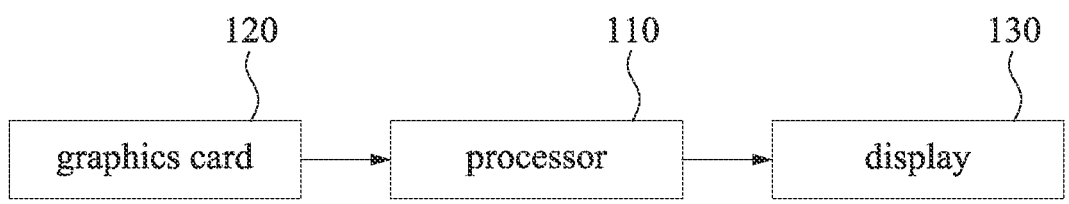
FIG. 1 is a block diagram of a display system based on some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

All words used herein have their usual meanings. The above-mentioned words are defined in commonly used dictionaries, and the usage examples of any words discussed in this specification are only examples. It should not be limited to the scope and meaning of the present disclosure. Similarly, the present disclosure is not limited to the various embodiments shown in the specification.

In this article, using the terms first, second, third, etc., it is understandable that it is used to describe various elements, components, regions, layers and/or blocks. However, these elements, components, regions, layers and/or blocks should not be limited by these terms. These terms are only used to identify single element, component, region, layer and/or block. Therefore, in the following, a first element, component, region, layer and/or block also be referred to as a second element, component, region, layer and/or block without departing from the original meaning of the present disclosure. As used herein, "and/or" includes any one and all combinations of one or more associated items.

Regarding the "coupling" or "connection" used in this article, it can mean that two or more elements make physical or electrical contact with each other directly, or make physical or electrical contact with each other indirectly, and also refer to two or more components interoperating or acting.

Refer to FIG. 1. FIG. 1 is a block diagram of a display system based on some embodiments of the present disclosure. The display system 100 includes a processor 110, a graphics card 120 and a display 130. The processor 110 is coupled to the graphics card 120 and the display 130. In some embodiments, the processor 110 is a central processing unit (CPU) or a graphics processing unit (GPU), and included in any devices that can be configured with a monitor and a graphics card, such as a notebook computer, a desktop computer, and a tablet computer. In some embodiments, the display system 100 further includes a storage element coupled to the processor 110 for storing the received data.

Figure 2:
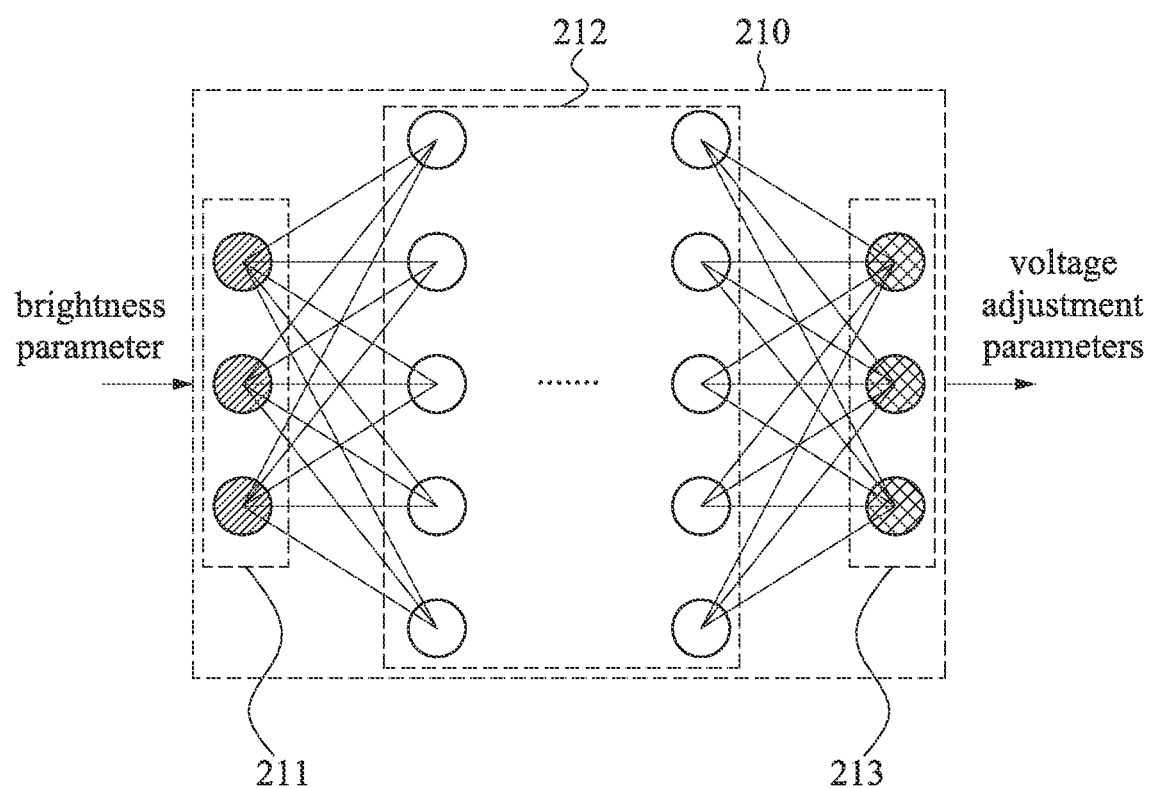
FIG. 2 is a schematic diagram of an artificial intelligence model based on some embodiments of the present disclosure.

Refer to FIG. 2. FIG. 2 is a schematic diagram of an artificial intelligence model based on some embodiments of the present disclosure. As shown in FIG. 2, in some embodiments, the artificial intelligence model 210 includes an input layer 211 and an output layer 213 with multiple neurons. A neural network constructed by multiple hidden layers 212 is also included between the input layer 211 and the output layer 213. The hidden layer 212 is also composed of many neurons, and is configured to transmit and process data.

Figure 3:
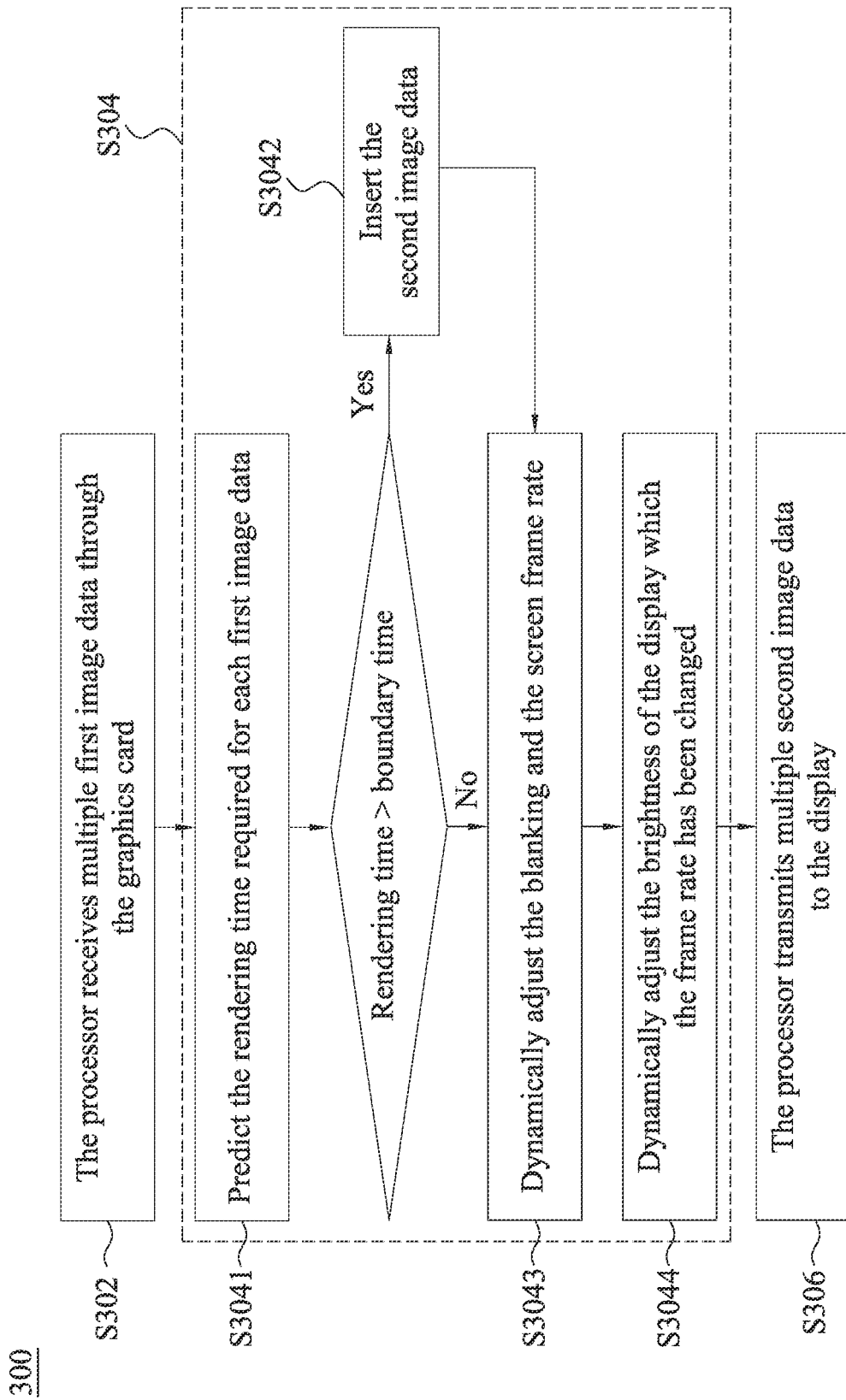
FIG. 3 is a flowchart of a display method based on some embodiments of the present disclosure.

Refer to FIG. 1, FIG. 2 and FIG. 3 at the same time. FIG. 3 is a flowchart of a display method based on some embodiments of the present disclosure, and is used to cooperate with the display system 100 in FIG. 1 and the artificial intelligence model 210 in FIG. 2 for operation. In step S302, the processor 110 receives multiple first image data through the graphics card 120. In step 304, the processor 110 analyzes the received multiple first image data based on the artificial intelligence model 210. In step 306, the processor 110 transmits multiple second image data to the display 130. Wherein, multiple second image data includes multiple first image data, at least one compensation image data between adjacent two of multiple first image data, or a combination thereof.

Each first image data corresponds to a rendering time. The said rendering time is the time required for a single image to be drawn on the display, which may vary due to multiple factors such as the size, resolution, and complexity of the image data. In some embodiments, the display method 300 includes step 3041 and step 3042. In step 3041, the artificial intelligence model 210 trained through machine learning can be used to predict the rendering time required for each first image data to be drawn on the display, and step 3042 inserts one or more similar compensation image data to compensate a picture when it is predicted that the required rendering time is greater than a boundary time. In some embodiments, the above mentioned boundary time is the minimum interval time (approximately 2 milliseconds) during which the human eye can distinguish the discontinuity of the picture.

Figure 4A:
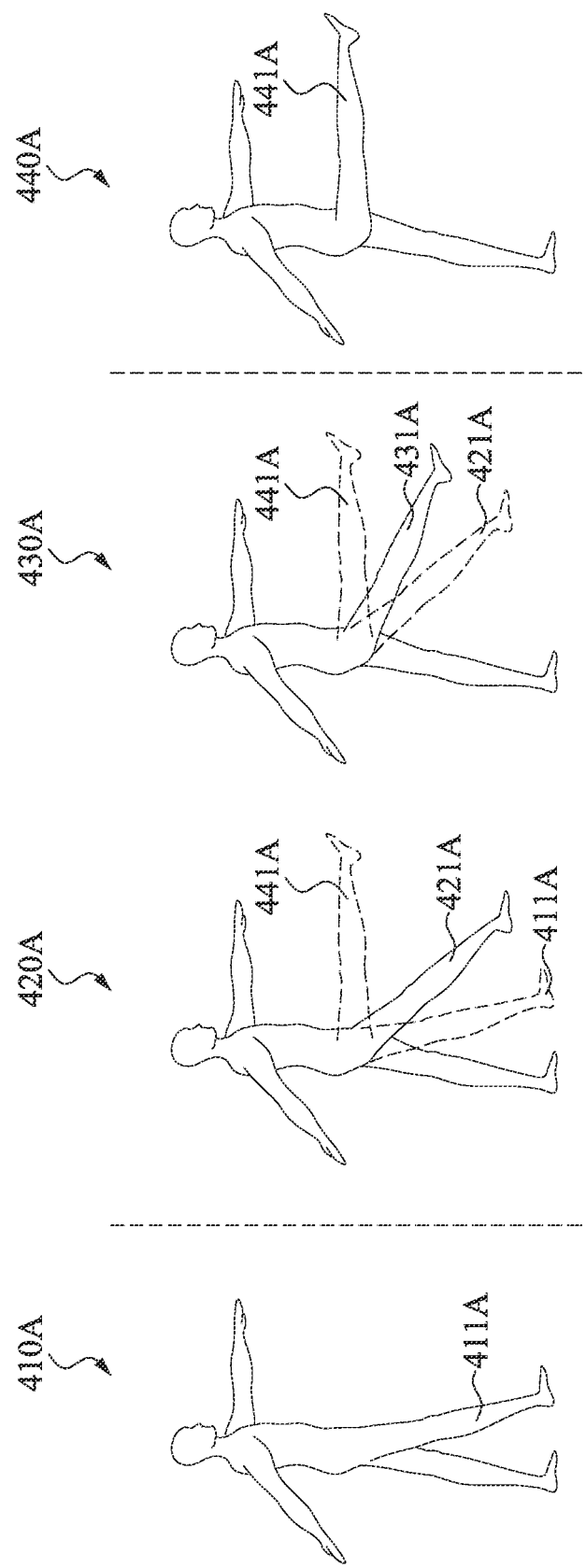
FIG. 4A is a schematic diagram of a picture compensation based on some embodiments of the present disclosure.

Refer to the FIG. 4A. FIG. 4A is a schematic diagram of a picture compensation based on some embodiments of the present disclosure. As shown in FIG. 4A, in some embodiments, the compensation image data between the two first image data can be generated by interpolation method. In this condition, a linear relationship does not exist between the inserted compensation image data and the original first image data. For example, if it is necessary to insert the compensation image data between the two original images 410A and 440A, the position of the leg 421A in the image 420A is between the leg 411A in the image 410A and the leg 441A in the image 440A. Similarly, the leg 431A in the image 430A between the image 420A and the image 440A is between the leg 421A in the image 420A and the leg 441A in the image 440A.

Figure 4B:
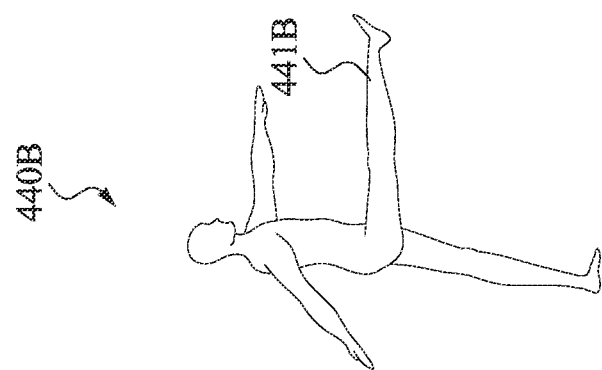
FIG. 4B is a schematic diagram of a picture compensation based on other embodiments of the present disclosure.
Figure 4B:
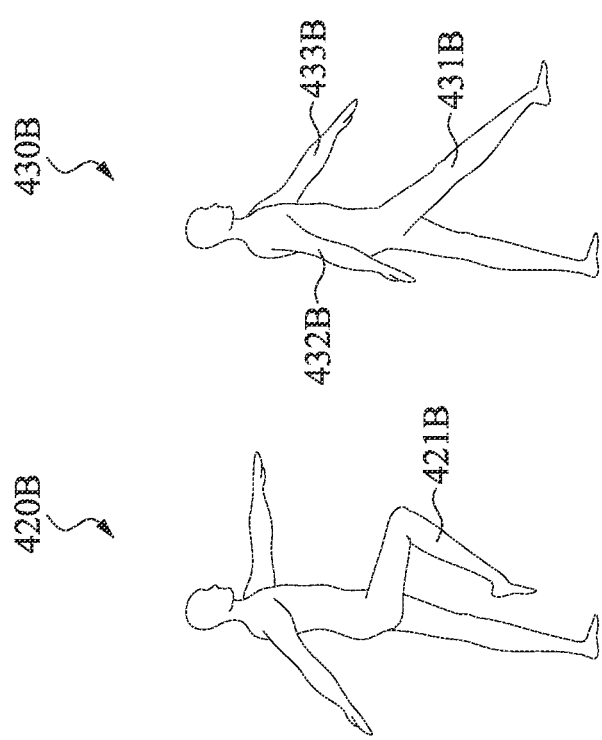
Figure 4B:
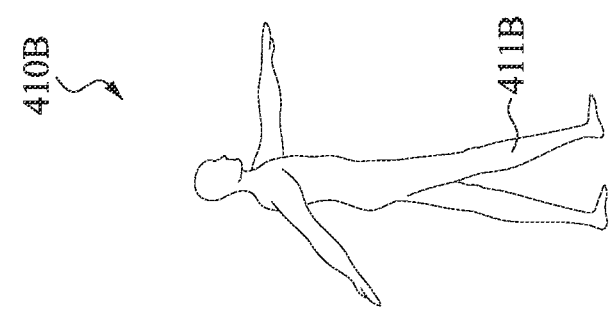

Refer to FIG. 4B. FIG. 4B is a schematic diagram of a picture compensation based on other embodiments of the present disclosure. As shown in FIG. 4B, in some embodiments, the compensation image data inserted between the two first image data can be generated by the artificial intelligence model 210 as shown in FIG. 2. The artificial intelligence model 210 is trained by a large quantity of similar dynamic image various inputs, and the linear relationship does not exist between the compensation image data generated by the artificial intelligence model and the original first image data. For example, if the compensation image data is inserted between the original two images 410B and 440B, a continuous bending and lifting motion such as the leg 421B in the image 420B and the leg 431B in the image 430B is generated. between the leg 411B and the leg 441B based on the existence of the "knee joint" learned by the artificial intelligence model 210. Similarly, although the hand positions of image 410B and image 440B are the same, the sagging hand movement can be inserted such as the hand 432B and the hand 433B in the image 430B, not limited to the original fixed position, to make the image more vivid based on the training data of the artificial intelligence model 210.

In some embodiments, in order to match the output frame rate of the graphics card 120, the display method 300 includes step 3043. The display 130 dynamically increases or decreases the frame rate (for example, G-sync synchronization technology) by adjusting the blanking between each period of the display screen scanning. The above adjustment can be performed by the artificial intelligence model 210.

In the above embodiment, the display method 300 further includes step 3044 after step 3043. In step 3044, the artificial intelligence model 210 is configured to dynamically adjust the voltage to compensate the brightness of the display 130 which the frame rate has been changed. As the screen frame rate is changed, the grayscale brightness of the display also changes. Specifically, since the gap period is equivalent to that the display is in a leakage state, the voltage received by each pixel drops. When adjusting the gap in step 3043 and the gap is enlarged, the screen frame rate of the display decreases, and the brightness decreases accordingly. Conversely, when the gap is reduced, the screen frame rate of the display increases, and the brightness increases accordingly.

If avoiding the brightness difference after the display changes the frame rate is needed, increasing or decreasing the voltage to compensate so as to adjust the brightness is needed.

The artificial intelligence model 210 uses the display 130 to receive the first image data and then dynamically adjust the first brightness parameter after the screen frame rate is used as input, and the required voltage adjustment parameter is used as output. The above mentioned voltage adjustment parameter corresponds to the difference between the second brightness parameter after the frame rate is changed by the display and the first brightness parameter before the frame rate is changed by the display. The voltage adjustment parameters obtained by the artificial intelligence model 210 through machine learning can solve the brightness difference of the display caused by the changing frame rate, and make the display maintain the same brightness while adjusting the frame rate with the graphics card.

It should be noted that the above-mentioned operations of using the artificial intelligence model 210 to perform compensation image data generation, rendering time prediction, screen frame rate adjustment, and voltage adjustment parameter calculation, etc. can be carried out in any order, and the present disclosure is not limited to the order of the above methods.

In summary, the display method provided by the present disclosure can insert compensation image data in adjacent image data, so that it can provide a continuous picture viewing experience. Furthermore, the display method provided by the present disclosure can predict the rendering time of the image by the artificial intelligence model, and can adjust the display voltage to avoid the brightness difference caused by the display changing frame rate.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display method, comprising:
   receiving a plurality of first image data through a graphics card by a processor;
   analyzing the plurality of first image data by the processor based on an artificial intelligence model;
   calculating a rendering time required for at least one of the plurality of first image data by the processor based on the artificial intelligence model;
   generating at least one compensation image data by the processor when the rendering time is greater than a boundary time; and
   transmitting a plurality of second image data to a display by the processor,
   wherein the plurality of second image data comprise the plurality of first image data, the at least one compensation image data between adjacent two of the plurality of first image data, or combinations thereof.

2. The display method of claim 1, further comprising:
   receiving a first brightness parameter corresponding to the plurality of first image data, which is displayed by the display, by the processor;

transmitting a second brightness parameter corresponding to the plurality of second image data, which is displayed by the display, by the processor; and providing a voltage adjustment parameter to the display by the processor based on a difference between the second brightness parameter and the first brightness parameter.

3. The display method of claim 1, wherein a linear relationship does not exist between two of the plurality of first image data and the at least one compensation image.

4. The display method of claim 1, further comprising:
generating the at least one compensation image data by the processor based on the artificial intelligence model, wherein the at least one compensation image data is a non-linear continuous image data between adjacent two of the plurality of first image data.

5. The display method of claim 4, further comprising:
dynamically adjusting a frame rate of the display by the processor based on the artificial intelligence model.

6. The display method of claim 5, further comprising:
dynamically adjusting a voltage parameter of the display by the processor based on the artificial intelligence model after the processor dynamically adjusts the frame rate of the display.

7. The display method of claim 1, further comprising:
dynamically adjusting a frame rate of the display by the processor based on the artificial intelligence model when the rendering time is less than the boundary time.

8. The display method of claim 7, further comprising:
dynamically adjusting the display to have a second brightness parameter corresponding to the frame rate by the processor based on the artificial intelligence model after the processor dynamically adjusts the frame rate of the display, wherein the second brightness parameter is equal to a first brightness parameter.

9. The display method of claim 1, further comprising:
dynamically adjusting a frame rate of the display by the processor based on the artificial intelligence model after the processor generates the at least one compensation image data.

10. The display method of claim 9, further comprising:
dynamically adjusting the display to have a second brightness parameter corresponding to the frame rate by the processor based on the artificial intelligence model after the processor dynamically adjusts the frame rate of the display, wherein the second brightness parameter is equal to a first brightness parameter.

* * * * *